United States Patent
Terakawa et al.

(10) Patent No.: US 11,217,277 B2
(45) Date of Patent: *Jan. 4, 2022

(54) MAGNETIC RECORDING MEDIUM HAVING CONTROLLED COERCIVE FORCE RATIO

(71) Applicant: Sony Corporation, Tokyo (JP)

(72) Inventors: Masaru Terakawa, Miyagi (JP); Yoichi Kanemaki, Miyagi (JP); Minoru Yamaga, Miyagi (JP)

(73) Assignee: Sony Corporation, Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 16/609,993

(22) PCT Filed: Apr. 13, 2018

(86) PCT No.: PCT/JP2018/015510
§ 371 (c)(1),
(2) Date: Oct. 31, 2019

(87) PCT Pub. No.: WO2018/203468
PCT Pub. Date: Nov. 8, 2018

(65) Prior Publication Data
US 2020/0066302 A1     Feb. 27, 2020

(30) Foreign Application Priority Data

May 1, 2017   (JP) .............................. JP2017-091269

(51) Int. Cl.
*G11B 5/706*   (2006.01)
*G11B 5/712*   (2006.01)
(Continued)

(52) U.S. Cl.
CPC .......... *G11B 5/706* (2013.01); *G11B 5/70642* (2013.01); *G11B 5/712* (2013.01);
(Continued)

(58) Field of Classification Search
None
See application file for complete search history.

(56) References Cited

U.S. PATENT DOCUMENTS 5,358,660 A * 10/1994 Kidoh ................... C04B 35/265
                                                        252/62.56
10,720,181 B1 * 7/2020 Yamaga ................. G11B 5/667
(Continued)

FOREIGN PATENT DOCUMENTS

JP      H01-311418 A     12/1989
JP      H05-314457 A     11/1993
(Continued)

OTHER PUBLICATIONS

International Search Report and Written Opinion issued in connection with PCT Application No. PCT/JP2018/015510, dated Jul. 3, 2018. (9 pages).

*Primary Examiner* — Kevin M Bernatz
(74) *Attorney, Agent, or Firm* — K&L Gates LLP

(57) ABSTRACT

Provided is a magnetic recording medium including: a recording layer containing a powder of particles containing ε iron oxide, in which a ratio ((Hc(50)/Hc(25))×100) of a coercive force Hc(50) measured in a thickness direction of the magnetic recording medium at 50° C. and a coercive force Hc(25) measured in the thickness direction of the magnetic recording medium at 25° C. is 95% or greater, the coercive force Hc(25) is 200 kA/m or greater, and a squareness ratio measured in a transport direction of the magnetic recording medium is 30% or less.

10 Claims, 3 Drawing Sheets

(51) Int. Cl.
*G11B 5/714* (2006.01)
*H01F 1/03* (2006.01)
*H01F 1/36* (2006.01)
*H01F 1/24* (2006.01)

(52) U.S. Cl.
CPC .......... *G11B 5/714* (2013.01); *C01P 2004/84* (2013.01); *C01P 2006/42* (2013.01); *H01F 1/03* (2013.01); *H01F 1/24* (2013.01); *H01F 1/36* (2013.01)

(56) References Cited

U.S. PATENT DOCUMENTS

| | | | | |
|---|---|---|---|---|
| 10,796,724 | B1* | 10/2020 | Nakashio | G11B 23/0312 |
| 10,803,904 | B1* | 10/2020 | Yamaga | G11B 5/667 |
| 10,839,846 | B2* | 11/2020 | Yamaga | G11B 5/7358 |
| 10,839,847 | B2* | 11/2020 | Terakawa | G11B 5/62 |
| 10,867,630 | B2* | 12/2020 | Sekiguchi | C23C 14/562 |
| 10,923,148 | B2* | 2/2021 | Enomoto | G11B 5/70678 |
| 10,937,457 | B2* | 3/2021 | Yamaga | G11B 5/584 |
| 11,100,948 | B2* | 8/2021 | Kawakami | G11B 5/733 |
| 2011/0027588 | A1* | 2/2011 | Hattori | B22F 1/025 |
| | | | | 428/403 |
| 2014/0219069 | A1* | 8/2014 | Hattori | G11B 5/7368 |
| | | | | 369/13.14 |
| 2015/0111066 | A1* | 4/2015 | Terakawa | G11B 5/70 |
| | | | | 428/836.2 |
| 2017/0287516 | A1 | 10/2017 | Sakane et al. | |
| 2017/0330661 | A1 | 11/2017 | Hattori et al. | |
| 2019/0287562 | A1* | 9/2019 | Kawakami | G11B 5/70 |
| 2020/0312365 | A1* | 10/2020 | Yamaga | G11B 5/7334 |
| 2020/0342905 | A1* | 10/2020 | Yamaga | G11B 5/78 |
| 2020/0342908 | A1* | 10/2020 | Yamaga | G11B 5/714 |
| 2020/0411043 | A1* | 12/2020 | Yamaga | G11B 5/62 |
| 2021/0012798 | A1* | 1/2021 | Terakawa | G11B 5/70678 |
| 2021/0020196 | A1* | 1/2021 | Sekiguchi | C23C 14/0021 |

FOREIGN PATENT DOCUMENTS

| | | |
|---|---|---|
| JP | 4687136 B2 | 5/2011 |
| JP | 5013505 B2 | 8/2012 |
| JP | 2014-154178 A | 8/2014 |
| WO | 2016/092744 A1 | 6/2016 |

* cited by examiner

MAGNETIC RECORDING MEDIUM HAVING CONTROLLED COERCIVE FORCE RATIO

TECHNICAL FIELD

The present technology relates to a magnetic recording medium.

BACKGROUND ART

In a magnetic tape for high-density recording supporting Linear Tape-Open 6 (LTO-6), hexagonal barium ferrite magnetic powder is used instead of needle-like magnetic powder. Besides barium ferrite magnetic powder, cubic CoMn spinel ferrite magnetic powder (see Patent Literature 1 for example), $\varepsilon\text{-}Fe_2O_3$ magnetic powder (see Patent Literature 2 for example), and the like have been reported as magnetic powders for achieving high-density recording.

CITATION LIST

Patent Document

Patent Document 1: Japanese Patent No. 4687136
Patent Document 2: Japanese Patent No. 5013505

SUMMARY OF THE INVENTION

Problems to be Solved by the Invention

Meanwhile, in recent years, library devices using magnetic tape for archival purposes are beginning to show promise. In a library device, because magnetic tape is kept at a constant temperature of approximately 50° C., a lowering of the signal-noise ratio (SNR) in a high-temperature environment due to magnetization loss by heat is a concern. In next-generation magnetic tape having a higher recording density, because the magnetic particles contained in the recording layer are atomized further, the lowering of the SNR in a high-temperature environment is thought to become more significant.

An object of the present technology is to provide a magnetic recording medium capable of suppressing SNR degradation in a high-temperature environment.

Solutions to Problems

The present technology to achieve the above object relates to a magnetic recording medium including: a recording layer containing a powder of particles containing ε iron oxide, in which a ratio ((Hc(50)/Hc(25))×100) of a coercive force Hc(50) measured in a thickness direction of the magnetic recording medium at 50° C. and a coercive force Hc(25) measured in the thickness direction of the magnetic recording medium at 25° C. is 95% or greater, the coercive force Hc(25) is 200 kA/m or greater, and a squareness ratio measured in a transport direction of the magnetic recording medium is 30% or less.

Effects of the Invention

According to the present technology, SNR degradation in a high-temperature environment can be suppressed. However, the advantageous effects are not necessarily limited to the one described here, and may also be any of the advantageous effects described in this disclosure or dissimilar advantageous effects.

MODE FOR CARRYING OUT THE INVENTION

Figure 1:
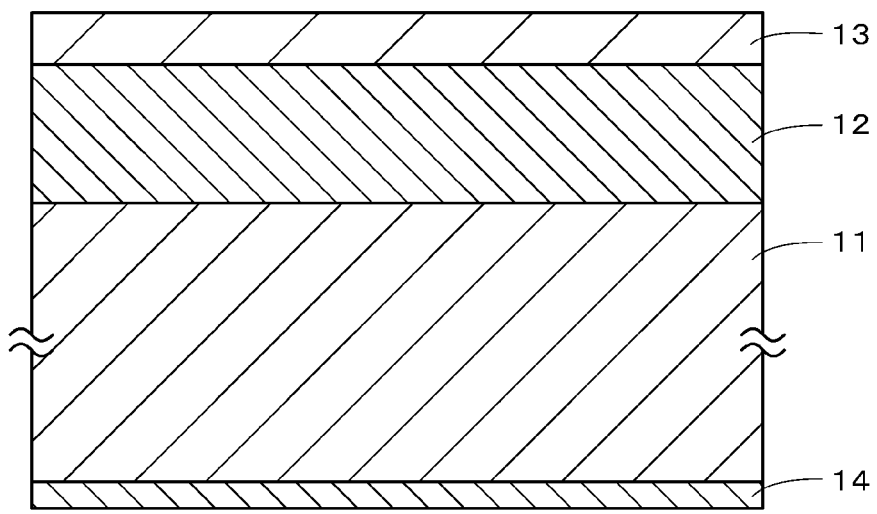
FIG. 1 is a cross-section diagram illustrating a configuration of a magnetic recording medium according to an embodiment of the present technology.

The embodiment of the present technology will be described in the following order.
  Configuration of magnetic recording medium
  Method of manufacturing magnetic recording medium
  Effects
  Modifications
  [Configuration of Magnetic Recording Medium]
A magnetic recording medium according to one embodiment of the present technology is, as illustrated in FIG. 1, provided with an elongated substrate 11, a foundation layer (non-magnetic layer) 12 provided on one of the principal planes of the substrate 11, and a recording layer (magnetic layer) 13 provided on the foundation layer 12. As necessary, the magnetic recording medium additionally may be provided with a protective layer (not illustrated), a lubricant layer (not illustrated), and the like provided on the recording layer 13. Also, as necessary, a backcoat layer 14 provided on the other principal plane of the substrate 11 additionally may be provided. The magnetic recording medium has an elongated shape, and is transported in the lengthwise direction during recording and reproduction.

The magnetic recording medium according to one embodiment is preferably used in a library device, which is a large-scale magnetic tape data archive device. Also, the magnetic recording medium according to one embodiment is configured to be capable of recording a signal having a shortest recording wavelength of 75 nm or less for example, and is used in a recording and reproduction device having a shortest recording wavelength of 75 nm or less. The above recording and reproduction device is provided with a ring head as the head for recording, and uses the ring head to record a signal having a shortest recording wavelength of 75 nm or less to the magnetic recording medium.

(Coercive force Hc)
A ratio R (=(Hc(50)/Hc(25))×100) of a coercive force Hc(50) measured in the thickness direction (perpendicular direction) of the magnetic recording medium at 50° C. and a coercive force Hc(25) measured in the thickness direction of the magnetic recording medium at 25° C. is 95% or greater, preferably 96% or greater, more preferably 97% or greater, and even more preferably 98% or greater. If the above ratio R is less than 95%, the temperature dependence of the coercive force Hc becomes large, and there is a possibility that SNR degradation in a high-temperature environment will become difficult to suppress.

The coercive force Hc(25) measured in the thickness direction (perpendicular direction) of the magnetic recording medium at 25° C. is preferably 200 kA/m or greater, more preferably 200 kA/m or greater and 340 kA/m or less, even more preferably 220 kA/m or greater and 320 kA/m or less, and particularly preferably 230 kA/m or greater and 300 kA/m or less. If the coercive force Hc(25) is less than 200 kA/m, there is a possibility that the above ratio R will be less than 95%. Consequently, the temperature dependence of the coercive force Hc becomes large, and there is a possibility that SNR degradation in a high-temperature environment will become difficult to suppress. On the other hand, if the coercive force Hc(25) is 340 kA/m or less, a favorable SNR at 25° C. can be obtained.

The coercive force Hc(50) measured in the thickness direction of the magnetic recording medium at 50° C. is preferably 190 kA/m or greater, more preferably 190 kA/m or greater and 310 kA/m or less, even more preferably 200 kA/m or greater and 300 kA/m or less, and particularly preferably 210 kA/m or greater and 280 kA/m or less. If the coercive force Hc(50) is 190 kA/m or greater, there is a possibility that the above ratio R will be less than 95%. Consequently, the temperature dependence of the coercive force Hc becomes large, and there is a possibility that SNR degradation in a high-temperature environment will become difficult to suppress. On the other hand, if the coercive force Hc is 310 kA/m or less, a favorable SNR at 25° C. can be obtained.

The above coercive force Hc (25) is obtained as follows. First, a measurement sample is cut out from the elongated magnetic recording medium, and a vibrating sample magnetometer (VSM) is used to measure the M-H loop of the entire measurement sample in the thickness direction of the measurement sample (the thickness direction of the magnetic recording medium). Next, acetone, ethanol, or the like is used to wipe off the coating film (such as the foundation layer 12 and the recording layer 13) leaving only the substrate 11 to use for background correction, and the VSM is used to measure the M-H loop of the substrate 11 in the thickness direction of the substrate 11 (the thickness direction of the magnetic recording medium). After that, the M-H loop of the substrate 11 is subtracted from the M-H loop of the entire measurement sample to obtain a background-corrected M-H loop. The coercive force Hc is computed from the obtained M-H loop. Note that both of the measurements of the M-H loop above are assumed to be performed at 25° C. Also, it is assumed that "diamagnetic field correction" is not performed when measuring the M-H loop in the thickness direction (perpendicular direction) of the magnetic recording medium.

The coercive force Hc(50) above is computed similarly to the method of measuring the coercive force Hc(25) above, except that the M-H loops of the measurement sample and the substrate 11 are both measured at 50° C.

(Squareness Ratios S1 and S2)

The squareness ratio S1 measured in the transport direction (lengthwise direction) of the magnetic recording medium is preferably 30% or less, more preferably 25% or less, and even more preferably 20% or less. If the squareness ratio S1 exceeds 30%, the perpendicular orientation of the recording layer 13 becomes lower, and there is a possibility that the above ratio R will be less than 95%. Consequently, the temperature dependence of the coercive force Hc becomes large, and there is a possibility that SNR degradation in a high-temperature environment will become difficult to suppress.

The squareness ratio S2 measured in the width direction of the magnetic recording medium is preferably 30% or less, more preferably 25% or less, and still more preferably 20% or less. If the squareness ratio S2 exceeds 30%, the perpendicular orientation of the recording layer 13 becomes lower, and there is a possibility that the above ratio R will be less than 95%. Consequently, the temperature dependence of the coercive force Hc becomes large, and there is a possibility that SNR degradation in a high-temperature environment will become difficult to suppress.

The squareness ratio S measured in an arbitrary in-plane direction of the magnetic recording medium is preferably 30% or less, more preferably 25% or less, and still more preferably 20% or less. If the squareness ratio S exceeds 30%, the perpendicular orientation of the recording layer 13 becomes lower, and there is a possibility that the above ratio R will be less than 95%. Consequently, the temperature dependence of the coercive force Hc becomes large, and there is a possibility that SNR degradation in a high-temperature environment will become difficult to suppress.

The above squareness ratio S1 is obtained as follows. First, a measurement sample is cut out from the elongated magnetic recording medium, and a VSM is used to measure the M-H loop of the entire measurement sample corresponding to the transport direction (lengthwise direction) of the magnetic recording medium. Next, acetone, ethanol, or the like is used to wipe off the coating film (such as the foundation layer 12 and the recording layer 13) leaving only the substrate 11 to use for background correction, and the VSM is used to measure the M-H loop of the substrate 11 corresponding to the transport direction of the substrate 11 (the transport direction of the magnetic recording medium). After that, the M-H loop of the substrate 11 is subtracted from the M-H loop of the entire measurement sample to obtain a background-corrected M-H loop. The saturation magnetization Ms (emu) and the residual magnetization Mr (emu) of the obtained M-H loop are substituted into the following formula to calculate the squareness ratio S1 (%). Note that both of the measurements of the M-H loop above are assumed to be performed at 25° C.

$$\text{Squareness ratio } S1(\%) = (Mr/Ms) \times 100$$

The squareness ratio S2 above is obtained similarly to the method of measuring the squareness ratio S1 above, except that the M-H loops of the entire measurement sample and the substrate 11 corresponding to the width direction of the magnetic recording medium are measured.

The squareness ratio S above is obtained similarly to the method of measuring the squareness ratio S1 above, except that the M-H loops of the entire measurement sample and the substrate 11 corresponding to the arbitrary in-plane direction of the magnetic recording medium are measured.

(Activation Volume $V_{act}$)

The activation volume $V_{act}$ is preferably 5000 nm$^3$ or less, more preferably 4000 nm$^3$ or less, and even more preferably 3000 nm$^3$ or less. If the activation volume $V_{act}$ is 5000 nm$^3$ or less, it is possible to make a steep bit inversion region, and a favorable SNR can be obtained.

The above activation volume $V_{act}$ is computed according to the following formula derived by Street & Woolley:

$$V_{act} (\text{nm}^3) = k_B \times T \times X_{irr} / (\mu_0 \times Ms \times S)$$

(where $k_B$ is the Boltzmann constant ($1.38 \times 10^{-23}$ J/K), T is the temperature (K), $X_{irr}$ is the irreversible susceptibility, $\mu_0$ is the magnetic permeability in a vacuum, S is a magnetic viscosity coefficient, and Ms is the saturation magnetization (emu/cm$^3$)).

The irreversible susceptibility $X_{irr}$, the saturation magnetization Ms, and the magnetic viscosity coefficient S substituted into the above formula are computed as follows using the VSM. Note that the direction of measurement by the VSM is assumed to be the thickness direction (perpendicular direction) of the magnetic recording medium. Also, the measurement by the VSM is assumed to be performed at 25° C. with respect to a measurement sample cut out from the elongated magnetic recording medium. Also, it is assumed that "diamagnetic field correction" is not performed when measuring the M-H loop in the thickness direction (perpendicular direction) of the magnetic recording medium.

(Irreversible Susceptibility $X_{irr}$)

The irreversible susceptibility $X_{irr}$ is defined to be the slope near the residual coercive force Hr in the slope of the residual magnetization curve (DCD curve). First, a magnetic field of −1193 kA/m (15 kOe) is applied to the entire magnetic recording medium, and the magnetic field is returned to zero to create a residual magnetization state. After that, a magnetic field of approximately 15.9 kA/m (200 Oe) is applied in the reverse direction and returned to zero again, and the amount of residual magnetization is measured. Similarly after that, measurement is performed repeatedly in which a magnetic field that is another 15.9 kA/m greater than the previously applied magnetic field is applied and returned to zero, and the amounts of residual magnetization with respect to the applied magnetic fields are plotted to measure the DCD curve. From the obtained DCD curve, the point at which the amount of magnetization becomes zero is treated as the residual coercive force Hr, and furthermore the derivative of the DCD curve is taken to compute the slope of the DCD curve for each magnetic field. In this slope of the DCD curve, the slope near the residual coercive force Hr becomes $X_{irr}$.

(Saturation Magnetization Ms)

First, the M-H loop of the entire magnetic recording medium (measurement sample) is measured in the thickness direction of the magnetic recording medium. Next, acetone, ethanol, and the like are used to wipe off the coating film (such as the foundation layer 12 and the recording layer 13) leaving only the substrate 11 to use for background correction, and the M-H loop of the substrate 11 is measured similarly in the thickness direction. After that, the M-H loop of the substrate 11 is subtracted from the M-H loop of the entire magnetic recording medium to obtain a background-corrected M-H loop. From the value of the saturation magnetization Ms (emu) of the obtained M-H loop and the volume ($cm^3$) of the recording layer 13 inside the measurement sample, Ms ($emu/cm^3$) is computed. Note that the volume of the recording layer 13 is computed by multiplying the average thickness of the recording layer 13 by the area of the measurement sample. The method of computing the average thickness of the recording layer 13 needed to compute the volume of the recording layer 13 will be described later.

(Magnetic Viscosity Coefficient S)

First, a magnetic field of −1193 kA/m (15 kOe) is applied to the entire magnetic recording medium (measurement sample), and the magnetic field is returned to zero to create a residual magnetization state. After that, a magnetic field with substantially the same value of the residual coercive force Hr obtained from the DCD curve is applied in the reverse direction. The amount of magnetization is measured continually at fixed time intervals for 1000 seconds in the state with the magnetic field applied. The relationship between the time t and the amount of magnetization M(t) obtained in this way is checked against the following formula to compute the magnetic viscosity coefficient S:

$$M(t) = M0 + S \times \ln(t)$$

(where M(t) is the amount of magnetization at the time t, M0 is an initial amount of magnetization, S is the magnetic viscosity coefficient, and ln(t) is the natural logarithm of the time).

(Substrate)

The substrate 11 that acts as a supporting medium is a flexible elongated non-magnetic substrate. The non-magnetic substrate is a film, and the thickness of the film is 3 µm or greater and 8 µm or less, for example. For the material of the substrate 11, for example, a polyester such as polyethylene terephthalate, a polyolefin such as polyethylene, polypropylene, a cellulose derivative such as cellulose triacetate, cellulose diacetate, or cellulose butyrate, a vinyl resin such as polyvinyl chloride or polyvinylidene chloride, a plastic such as polycarbonate, polyimide, or polyamide-imide, a light metal such as an aluminum alloy or a titanium alloy, a ceramic such as alumina glass, or the like can be used.

(Recording Layer)

The recording layer 13 is also referred to as a "perpendicular recording layer", and contains a magnetic powder, a binding agent, and conducting particles, for example. The recording layer 13 may additionally contain additives such as a lubricant, an abrasive, and an anticorrosive as necessary.

(Magnetic Powder)

The magnetic powder includes a powder of nanoparticles containing ε iron oxide (hereinafter referred to as "ε iron oxide particles"). The ε iron oxide particles can obtain high holding force even with fine particles. The ε iron oxide particles are spherical or substantially spherical, or alternatively cubic or substantially cubic. Because the ε iron oxide particles have a shape like the above, in the case of using the ε iron oxide particles as magnetic particles, the contact area between particles with each other in the thickness direction of the medium is reduced compared to the case of using hexagonal plate-like barium ferrite particles as the magnetic particles, and the aggregation of particles with each other can be restrained. Consequently, the dispersiveness of the magnetic powder can be raised and a more favorable SNR can be obtained.

Figure 2:
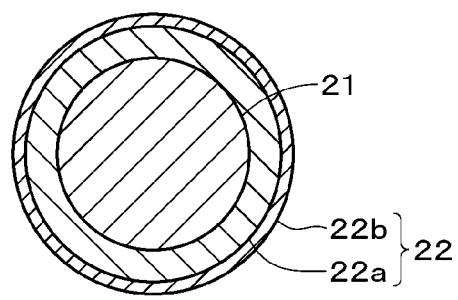
FIG. 2 is a cross-section diagram illustrating a configuration of a magnetic particle.

Each ε iron oxide particle has a core shell structure. Specifically, as illustrated in FIG. 2, each ε iron oxide particle is provided with a core part 21 and a dual-layer shell part 22 provided on the circumference of the core part 21. The dual-layer shell part 22 is provided with a first shell part 22a provided on the core part 21 and a second shell part 22b provided on the first shell part 22a.

The core part 21 contains ε iron oxide. The ε iron oxide contained in the core part 21 preferably takes $\varepsilon\text{-Fe}_2O_3$ as its primary phase, and more preferably includes single-phase $\varepsilon\text{-Fe}_2O_3$.

The first shell part 22a that is a soft magnetic layer covers at least a part of the circumference of the core part 21. Specifically, the first shell part 22a may cover the circumference of the core part 21 partially or cover the entire circumference of the core part 21. The exchange-coupling between the core part 21 and the first shell part 22a is taken to be sufficient, and from the perspective of improving the magnetic properties, the exchange-coupling preferably covers the entire surface of the core part 21.

The first shell part 22a is also referred to as a "soft magnetic layer", and contains a soft magnetic material such as α-Fe, Ni—Fe alloy, or Fe—Si—Al alloy, for example. The α-Fe may also be obtained by reducing the ε iron oxide contained in the core part 21.

The second shell part 22b is an oxide film that acts as an antioxidant layer. The second shell part 22b contains a iron oxide, aluminum oxide, or silicon oxide. The α oxide contains at least one type of iron oxide from among $Fe_3O_4$, $Fe_2O_3$, and FeO, for example. In the case in which the first shell part 22a contains α-Fe (a soft magnetic material), the α iron oxide may also be obtained by oxidizing the α-Fe contained in the first shell part 22a.

By having each ε iron oxide particle include the first shell part 22a as described above, the coercive force Hc of the core part 21 by itself can retain a large value to ensure thermostability, while the coercive force Hc for the ε iron oxide particle (core shell particle) as a whole can be adjusted to a coercive force Hc suited to recording. Also, by having each ε iron oxide particle include the second shell part 22b as described above, in and before the process of manufacturing the magnetic recording medium, the ε iron oxide particle is exposed to the air to produce rust and the like on the particle surface, and thereby a lowering of the properties of the ε iron oxide particle can be restrained. Consequently, degradation in the properties of the magnetic recording medium can be restrained.

The average particle size (average maximum particle size) D of the magnetic powder is preferably 22 nm or less, more preferably 8 nm or greater and 22 nm or less, and even more preferably 12 nm or greater and 22 nm or less.

The average particle size D of the magnetic powder above is obtained as follows. First, the magnetic recording medium to be measured is processed by the focused ion beam (FIB) method or the like to fabricate a thin section, and cross-sectional observation of the thin section is performed with a transmission electron microscope (TEM). Next, 500 ε iron oxide particles are chosen randomly from the taken TEM photograph, a maximum particle size $d_{max}$ of each of the particles is measured, and a particle distribution of the maximum particle size $d_{max}$ of the magnetic powder is obtained. Herein, the "maximum particle size $d_{max}$" means what is also referred to as the maximum Feret diameter, and specifically refers to the maximum from among the distances between two parallel lines drawn from every angle tangent to the contours of the ε iron oxide particles. After that, the median diameter (50% diameter, D50) of the maximum particle size $d_{max}$ is computed from the particle distribution of the computed maximum particle size $d_{max}$, and this is taken to be the average particle size (average maximum particle size) D.

The average thickness of the recording layer 13 is preferably 30 nm or greater and 120 nm or less, more preferably 40 nm or greater and 100 nm or less, even more preferably 40 nm or greater and 80 nm or less, and most preferably 40 nm or greater and 70 nm or less.

The average thickness [nm] of the recording layer 13 is computed as follows. First, the magnetic recording medium to be measured is processed by the FIB method or the like to fabricate a thin section having a principal plane parallel to the width direction of the magnetic recording medium, and cross-sectional observation of the thin section is performed with a TEM. Observation is performed preferably with an observation magnification of at least 100,000× or greater to make it possible to observe the thickness of the recording layer 13 clearly. Cross-sectional TEM observation is performed at a position every 100 m in the lengthwise direction (transport direction) of the magnetic, for a total of five locations. The thickness of the recording layer 13 is observed at 50 points uniformly per field of view, and the thicknesses of all five fields of view are simply averaged (arithmetic mean) to compute the average thickness [nm] of the recording layer 13.

(Binding Agent)

For the binding agent, a resin with a structure obtained by imparting cross-linking reactions to a polyurethane resin, a vinyl chloride resin, or the like is preferable. However, the binding agent is not limited to these, and may be combined appropriately with another resin according to the physical properties demanded of the magnetic recording medium and the like. Ordinarily, the resin to combine is not particularly limited insofar as the resin is typically used in a coating-type magnetic recording medium.

Examples include polyvinyl chloride, polyvinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, vinyl chloride-acrylonitrile copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resin, polyvinyl butyral, cellulose derivatives (cellulose acetate butyrate, cellulose diacetate, cellulose triacetate, cellulose propionate, nitrocellulose), styrene-butadiene copolymers, polyester resin, amino resin, and synthetic rubber.

Also, examples of thermosetting resins or reactive resins include phenolic resin, epoxy resin, urea resin, melamine resin, alkyd resin, silicone resin, polyamine resin, urea formaldehyde resin, and the like.

Also, for the purpose of improving the dispersiveness of the magnetic powder, a polar functional group such as $-SO_3M$, $-OSO_3M$, $-COOM$, or $P=O(OM)_2$ may also be introduced into each binding agent described above. Herein, "M" in the formulas is a hydrogen atom or an alkali metal such as lithium, potassium, or sodium.

Furthermore, the polar functional group may be one with a side chain having an end group of $-NR1R2$ or $-NR1R2R3^+X^-$, or one with a main chain of $>NR1R2^+X^-$. Herein, "R1", "R2", and "R3" in the formulas is a hydrogen atom or a hydrocarbon group, and $X^-$ is an ion of a halogen element such as fluorine, chlorine, bromine, or iodine, or is an inorganic or organic ion. Also, the polar functional group may also be $-OH$, $-SH$, $-CN$, an epoxy group, or the like.

(Additives)

The recording layer 13 additionally may contain aluminum oxide (α,β, or γ alumina), chrome oxide, silicon oxide, diamond, garnet, emery, boron nitride, titanium carbide, silicon carbide, titanium carbide, titanium oxide (rutile or anatase titanium oxide), or the like as non-magnetic reinforcing particles.

(Foundation Layer)

The foundation layer 12 is a non-magnetic layer containing a non-magnetic powder and a binding agent as its main components. As necessary, the foundation layer 12 may additionally contain at least one type of additive from among conducting particles, a lubricant, a hardener, an anticorrosive, and the like.

(Average Thickness of Foundation Layer)

The average thickness of the foundation layer 12 is preferably 0.6 µm or greater and 2.0 µm or less, and more preferably 0.8 µm or greater and 1.4 µm or less. Note that the method of computing the average thickness of the foundation layer 12 above is similar to the method of computing the average thickness of the recording layer 13.

(Non-Magnetic Powder)

The non-magnetic powder may be an inorganic substance or an organic substance. Also, the non-magnetic powder may be carbon black or the like. Examples of inorganic substances include metal, metal oxide, metal carbonate, metal sulfate, metal nitride, metal carbide, metal sulfide, and the like. The shape of the non-magnetic powder may be any of various shapes such as needle-like, spherical, cubic, and plate-like, for example, but is not limited thereto.

(Binding Agent)

The binding agent is similar to the recording layer 13 described above.

[Method of Manufacturing Magnetic Recording Medium]

Next, one example of a method of manufacturing the magnetic recording medium having the configuration described above will be described. First, a foundation layer-forming coating is prepared by kneading and dispersing the non-magnetic powder, the binding agent, and the like into a solvent. Next, a recording layer-forming coating is prepared by kneading and dispersing the magnetic powder, the binding agent, and the like into a solvent. In the preparation of the recording layer-forming coating and the foundation layer-forming coating, the following solvents, dispersing devices, and kneading devices can be used, for example.

Examples of solvents used in the coating preparation described above include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, halogenated hydrocarbon solvents such as methylene chloride, ethylene chloride, carbon tetrachloride, chloroform, and chlorobenzene, and the like. These may be used alone or by being mixed appropriately.

As the kneading device used in the coating preparation described above, a kneading device such as a continuous two-axis kneading machine, a continuous two-axis kneading machine capable of multi-stage dilution, a kneader, a pressure kneader, or a roll kneader can be used, for example, but the kneading device is not particularly limited to these devices. Also, as the dispersing device used in the coating preparation described above, a dispersing device such as a roll mill, a ball mill, a horizontal sand mill, a vertical sand mill, a spike mill, a pin mill, a tower mill, a pearl mill (such as "DCP Mill" manufactured by the Eirich Group), a homogenizer, or an ultrasonic dispersion machine can be used, but the dispersing device is not particularly limited to these devices.

Next, by applying the foundation layer-forming coating to one of the principal planes of the substrate 11 and drying, the foundation layer 12 is formed. Next, by applying the recording layer-forming coating on the foundation layer 12 and drying, the recording layer 13 is formed on the foundation layer 12. Note that while drying, the magnetic field of the magnetic powder is oriented in the thickness direction of the substrate 11 with a solenoid coil, for example. After forming the recording layer 13, the protective layer and the lubricant layer may be formed on the recording layer 13, and the backcoat layer 14 may also be formed on the other principal plane of the substrate 11 as necessary.

After that, the substrate 11 having the foundation layer 12 and the recording layer 13 formed thereon is rewound around a large-diameter core, and a hardening treatment is performed. Lastly, the substrate 11 having the foundation layer 12 and the recording layer 13 formed thereon is subjected to a calender process and then cut to a predetermined width. By the above, the intended magnetic recording medium is obtained.

Effects

The magnetic recording medium according to one embodiment of the present technology is provided with the recording layer 13 containing a powder of particles containing ε iron oxide. Also, the ratio $((Hc(50)/Hc(25))\times 100)$ of the coercive force $Hc(50)$ measured in the thickness direction of the magnetic recording medium at 50° C. and the coercive force $Hc(25)$ measured in the thickness direction of the magnetic recording medium at 25° C. is 95% or greater, the coercive force $Hc(25)$ is 200 kA/m or greater, and the squareness ratio S1 measured in the transport direction of the magnetic recording medium is 30% or less. With this arrangement, the temperature dependence of the coercive force Hc can be reduced, and SNR degradation in a high-temperature environment can be suppressed.

Also, in the case in which the ratio $((Hc(50)/Hc(25))\times 100)$ of the coercive force $Hc(50)$ measured in the thickness direction of the magnetic recording medium at 50° C. and the coercive force $Hc(25)$ measured in the thickness direction of the magnetic recording medium at 25° C. is 95% or greater, the squareness ratio S1 measured in the transport direction of the magnetic recording medium is 30% or less, the coercive force $Hc(25)$ is 200 kA/m or greater and 340 kA/m or less, and the activation volume is 5000 nm$^3$ or less, SNR degradation in a high-temperature environment can be suppressed, while in addition, a favorable SNR can be obtained.

[Modifications]

(Modification 1)

Figure 3:
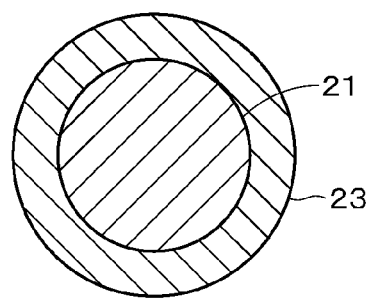
FIG. 3 is a cross-section diagram illustrating a configuration of a magnetic particle.

The foregoing embodiment describes a case in which each ε iron oxide particle has the dual-layer shell part 22, but as illustrated in FIG. 3, each ε iron oxide particle may have a single-layer shell part 23. In this case, the shell part 23 has a configuration similar to the first shell part 22a. However, from the perspective of restraining degradation in the properties of the ε iron oxide particles, it is preferable for each ε iron oxide particle to have the dual-layer shell part 22 like in the foregoing embodiment.

(Modification 2)

Figure 4:
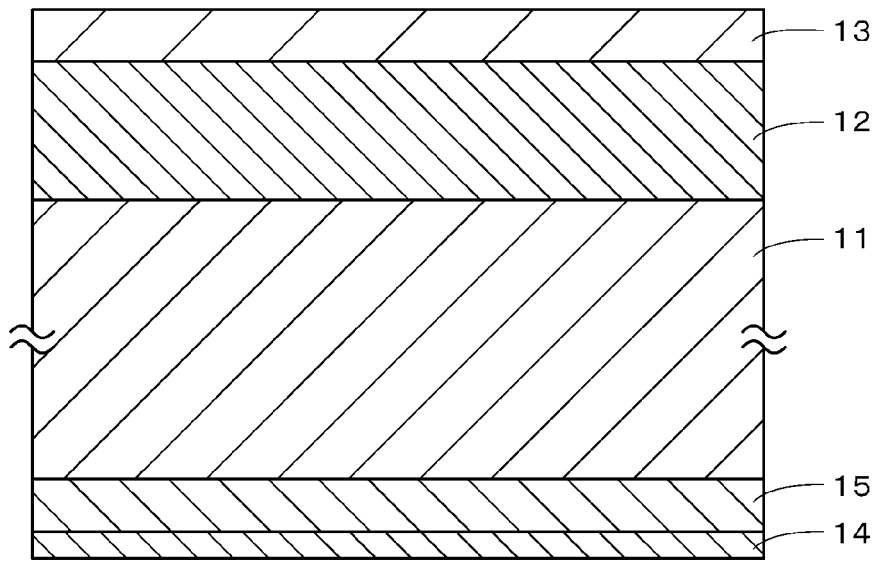
FIG. 4 is a cross-section diagram illustrating a configuration of a magnetic recording medium.

As illustrated in FIG. 4, the magnetic recording medium additionally may be provided with a reinforcement layer 15 provided on the other principal plane on the backcoat layer 14 side (hereinafter referred to as the "back face") from among the two principal planes of the substrate 11. In this case, the backcoat layer 14 is provided on the reinforcement layer 15.

Note that the reinforcement layer 15 may be provided on either of the two principal planes of the substrate 11, and the reinforcement layer 15 may also be provided on the principal plane on the recording layer 13 side (hereinafter referred to as the "front face") from among the two principal planes of the substrate 11. In this case, the foundation layer 12 is provided on the reinforcement layer 15.

The reinforcement layer 15 is for raising the mechanical strength of the magnetic recording medium and obtaining excellent dimensional stability. The reinforcement layer 15 contains at least one from among metals and metal compounds, for example. Herein, metals are defined to include semimetals. The metal is at least one of aluminum or copper, and is preferably copper, for example. This is because copper is inexpensive with a relatively low vapor pressure, thereby making it possible to form the reinforcement layer 15 inexpensively. The metal compound is a metallic oxide, for example. The metallic oxide is at least one from among aluminum oxide, copper oxide, and silicon oxide, and is preferably copper oxide, for example. This is because forming the reinforcement layer 15 inexpensively by vapor deposition or the like is possible. For example, the reinforcement layer 15 may be a vapor-deposited film formed by vacuum oblique angle vapor deposition, or a sputtered film formed by sputtering.

It is preferable for the reinforcement layer 15 to have a laminate structure of two or more layers. As the thickness of the reinforcement layer 15 is increased, expansion and contraction of the substrate 11 in response to external forces can be suppressed further. However, in the case of forming the reinforcement layer 15 using a vacuum thin-film manufacturing technique such as vapor deposition or sputtering, as the thickness of the reinforcement layer 15 is increased as above, there is a possibility of gaps in the reinforcement layer 15 occurring more readily. By causing the reinforcement layer 15 to have a laminate structure of two or more layers as above, the occurrence of gaps in the reinforcement layer 15 when forming the reinforcement layer 15 using a vacuum thin-film manufacturing technique can be suppressed, and the compactness of the reinforcement layer 15 can be improved. Consequently, because the moisture vapor transmission rate of the reinforcement layer 15 can be reduced, swelling of the substrate 11 can be restrained further, and the dimensional stability of the magnetic recording medium can be improved further. In the case in which the reinforcement layer 15 has a laminate structure of two or more layers, the material of each layer may be the same or different.

The average thickness of the reinforcement layer 15 is preferably 150 nm or greater and 500 nm or less. If the average thickness of the reinforcement layer 15 is 150 nm or greater, favorable functionality as the reinforcement layer 15 (that is, favorable dimensional stability of the magnetic recording medium) is obtained.

On the other hand, sufficient functionality as the reinforcement layer 15 can be obtained without having to increase the average thickness of the reinforcement layer 15 past 500 nm. Note that the average thickness of the reinforcement layer 15 above is computed similarly to the method of computing the average thickness of the recording layer 13 described earlier.

In the case in which the magnetic recording medium has the reinforcement layer 15, the Young's modulus in the lengthwise direction of the elongated magnetic recording medium is preferably 7 GPa or greater and 14 GPa or less. If Young's modulus is 7 GPa or greater, a favorable magnetic head hit can be obtained, and in addition, edge damage can be restrained. On the other hand, if Young's modulus is 14 GPa or less, a favorable magnetic head hit can be obtained.

Also, the coefficient of humidity expansion of the magnetic recording medium is preferably 0.5 ppm/% RH or greater and 4 ppm/% RH or less. If the coefficient of humidity expansion is in the above range, the dimensional stability of the magnetic recording medium can be improved further.

(Modification 3)

Figure 5:
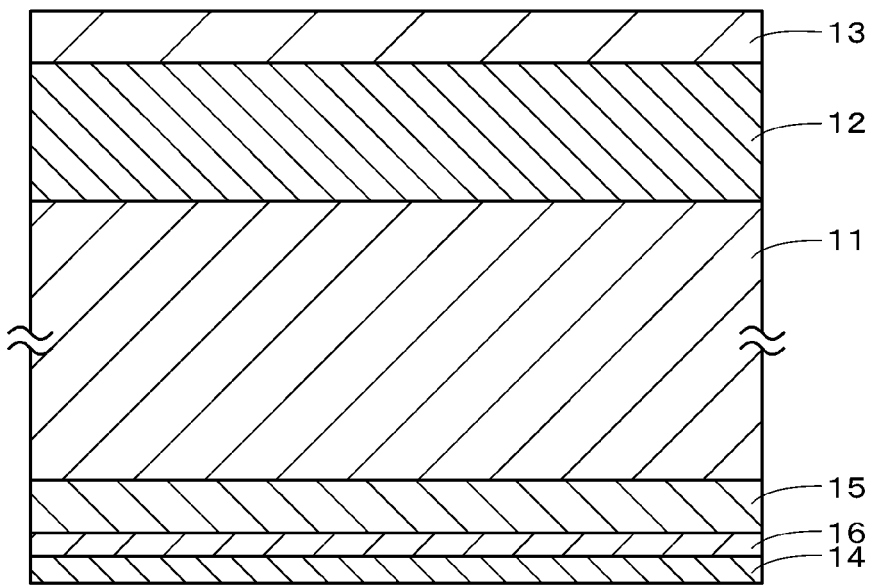
FIG. 5 is a cross-section diagram illustrating a configuration of a magnetic recording medium.

As illustrated in FIG. 5, the magnetic recording medium additionally may be provided with a cupping suppression layer 16 provided on the reinforcement layer 15. Note that in the case in which the foundation layer 12 and the cupping suppression layer 16 are provided on the back face side of the substrate 11, the backcoat layer 14 is provided on the cupping suppression layer 16. On the other hand, in the case in which the foundation layer 12 and the cupping suppression layer 16 are provided on the front face side of the substrate 11, the foundation layer 12 is provided on the cupping suppression layer 16.

The cupping suppression layer 16 is for suppressing cupping that occurs due to formation of the reinforcement layer 15 on the substrate 11. Herein, cupping means curvature occurring in the width direction of the elongated substrate 11. In the reinforcement layer 15, tensile stress acts as an internal stress, or in other words, stress works to curve the principal plane side on which the reinforcement layer 15 is provided from among the two principal planes of the substrate 11 in the width direction and in a concave shape. In contrast, in the cupping suppression layer 16, compressive stress acts as an internal stress, or in other words, stress works to curve the principal plane side on which the cupping suppression layer 16 is provided from among the two principal planes of the substrate 11 in the width direction and in a convex shape. For this reason, the internal stresses of the reinforcement layer 15 and the cupping suppression layer 16 cancel each other out, and the occurrence of cupping in the magnetic recording medium can be suppressed. Consequently, it is possible to provide a magnetic recording medium that can keep the state of contact between the magnetic head and the magnetic recording medium in a favorable state, while also excellent off-track characteristics with high dimensional stability in the track width direction.

The cupping suppression layer 16 is a carbon thin film, for example. The carbon thin film is preferably a hard carbon thin film containing diamond-like carbon (hereinafter referred to as "DLC"). For example, the cupping suppression layer 16 may be a chemical vapor deposition (CVD) film formed by CVD, or a sputtered film formed by sputtering.

It is preferable for the cupping suppression layer 16 to have a laminate structure of two or more layers. This is because the dimensional stability of the magnetic recording medium can be improved further. Note that the principle of the above is similar to the case of causing the reinforcement layer 15 to have a laminate structure of two or more layers. In the case in which the cupping suppression layer 16 has a laminate structure of two or more layers, the material of each layer may be the same or different.

The average thickness of the cupping suppression layer 16 is preferably 10 nm or greater and 200 nm or less. If the average thickness of the cupping suppression layer 16 is less than 10 nm, there is a possibility of the compressive stress of the cupping suppression layer 16 becoming too small. On the other hand, if the average thickness of the cupping suppression layer 16 exceeds 200 nm, there is a possibility of the compressive stress of the cupping suppression layer 16 becoming too large. Note that the average thickness of the cupping suppression layer 16 is computed similarly to the method of computing the average thickness of the recording layer 13 described earlier.

(Modification 4)

Figure 6:
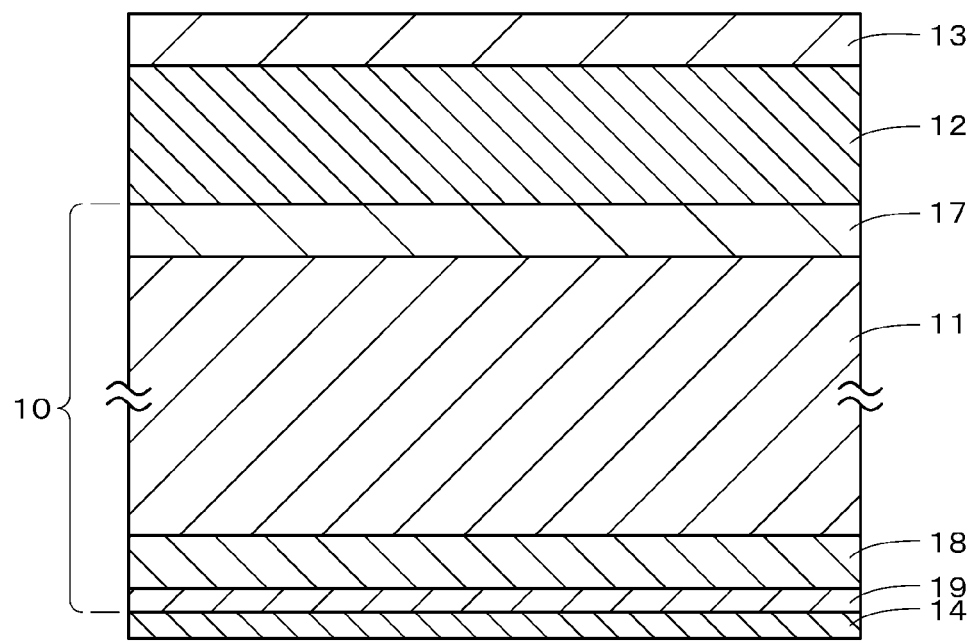
FIG. 6 is a cross-section diagram illustrating a configuration of a magnetic recording medium.

As illustrated in FIG. 6, the magnetic recording medium additionally may be provided with a first reinforcement layer 17 provided on the front face of the substrate 11, a second reinforcement layer 18 provided on the back face of the substrate 11, and an adhesion suppression layer 19 provided on the second reinforcement layer 18. In this case, the backcoat layer 14 is provided on the adhesion suppression layer 19. The substrate 11, the first reinforcement layer 17, the second reinforcement layer 18, and the adhesion suppression layer 19 form a laminate 10.

Note that it is sufficient for the adhesion suppression layer 19 to be provided on one of the first and second reinforcement layers 17 and 18, and the adhesion suppression layer 19 may also be provided on the first reinforcement layer 17. In this case, the foundation layer 12 is provided on the adhesion suppression layer 19. In this case, if the adhesion suppression layer 19 is a carbon thin film, it is preferable to improve the wettability of the surface of the adhesion suppression layer 19 by a surface reforming treatment. This is because the coating properties of the foundation layer-forming coating with respect to the carbon thin film can be improved.

The first and second reinforcement layers 17 and 18 are for raising the mechanical strength of the magnetic recording medium and obtaining excellent dimensional stability. As for the materials of the first and second reinforcement layers 17 and 18, materials similar to those in the reinforcement layer 15 of Modification 2 can be given as examples. Note that the first and second reinforcement layers 17 and 18 may be the same material or different materials. It is preferable for each of the first and second reinforcement layers 17 and 18 to have a laminate structure of two or more layers. This is because the dimensional stability of the magnetic recording medium can be improved further. Note that the principle of the above is similar to the case of causing the reinforcement layer 15 to have a laminate structure of two or more layers in Modification 2.

The average thickness of the first and second reinforcement layers 17 and 18 is preferably 75 nm or greater and 300 nm or less. If the average thickness of the first and second reinforcement layers 17 and 18 is 75 nm or greater, favorable functionality as the first and second reinforcement layers 17 and 18 (that is, favorable dimensional stability of the magnetic recording medium) is obtained. On the other hand, if the average thickness of the first and second reinforcement layers 17 and 18 is increased past 300 nm, there is a possibility of the magnetic recording medium becoming thick. Also, sufficient functionality as the first and second reinforcement layers 17 and 18 can be obtained without having to increase the average thickness of the first and second reinforcement layers 17 and 18 past 300 nm. Note that the average thickness of the first and second reinforcement layers 17 and 18 above is computed similarly to the method of computing the average thickness of the recording layer 13 described earlier.

In the first and second reinforcement layers 17 and 18, tensile stress works as an internal stress. Specifically, in the first reinforcement layer 17, stress works to curve the front face side of the substrate 11 in the width direction and in a concave shape, while in the second reinforcement layer 18, stress works to curve the back face side of the substrate 11 in the width direction and in a concave shape. Consequently, the internal stresses of the first and second reinforcement layers 17 and 18 cancel each other out, and the occurrence of cupping in the magnetic recording medium can be suppressed. Herein, cupping means curvature occurring in the width direction of the elongated substrate 11.

The average thickness of the first and second reinforcement layers 17 and 18 may be the same or different, but preferably is the same or substantially the same. This is because the internal stresses (tensile stresses) in the first and second reinforcement layers 17 and 18 provided on either side of the substrate 11 become the same or substantially the same, and the occurrence of cupping can be suppressed further. Herein, the average thickness of the first and second reinforcement layers 17 and 18 being substantially the same means that the difference in average thickness between the first and second reinforcement layers 17 and 18 is within 5 nm.

The adhesion suppression layer 19 is for suppressing metallic adhesion and sticking by the first and second reinforcement layers 17 and 18 in the case in which the laminate 10 is wound into a roll. The adhesion suppression layer 19 may be electrically conductive or insulating. The adhesion suppression layer 19 may be a layer in which compressive stress acts as an internal stress (in other words, stress works to curve the plane side on which the adhesion suppression layer 19 is provided from among the two principal planes of the substrate 11 in the width direction and in a convex shape), or a layer in which tensile stress acts as an internal stress (in other words, stress works to curve the plane side on which the adhesion suppression layer 19 is provided from among the substrate 11 in the width direction and in a concave shape).

In the case in which the tensile stresses (internal stresses) of the first and second reinforcement layers 17 and 18 are different, the adhesion suppression layer 19 having a compressive stress that works as an internal stress may be provided on the reinforcement layer having the larger tensile stress from among the first and second reinforcement layers 17 and 18. This is because the tensile stress that is not canceled out due to the difference in the tensile stresses of the first and second reinforcement layers 17 and 18 can be canceled out by the compressive stress of the adhesion suppression layer 19. Also, the adhesion suppression layer 19 having a tensile stress that works as an internal stress may be provided on the reinforcement layer having the smaller tensile stress from among the first and second reinforcement layers 17 and 18. This is because the compressive stress produced by the difference in the tensile stresses of the first and second reinforcement layers 17 and 18 can be canceled out by the tensile stress of the adhesion suppression layer 19.

The average thickness of the adhesion suppression layer 19 is preferably 1 nm or greater and 100 nm or less, more preferably 2 nm or greater and 25 nm or less, and even more preferably 2 nm or greater and 20 nm or less. If the average thickness of the adhesion suppression layer 19 is 1 nm or greater, it is possible to keep the average thickness of the adhesion suppression layer 19 from becoming too thin, and a reduction in functionality as the adhesion suppression layer 19 can be suppressed. On the other hand, if the average thickness of the adhesion suppression layer 19 is 100 nm or less, it is possible to keep the average thickness of the adhesion suppression layer 19 from becoming too thick, or in other words, keep the internal stress of the adhesion suppression layer 19 from becoming too large. The average thickness of the adhesion suppression layer 19 is computed similarly to the method of computing the average thickness of the recording layer 13 described earlier.

In the case in which an average thickness D2 of the second reinforcement layer 18 is 75 nm or greater and 300 nm or less, a ratio (D4/D2) of an average thickness D4 of the adhesion suppression layer 19 with respect to the average thickness D2 of the second reinforcement layer 18 is preferably 0.005 or greater and 0.35 or less. If the ratio (D4/D2) is 0.005 or less, it is possible to keep the average thickness D4 of the adhesion suppression layer 19 from becoming too thin with respect to the average thickness D2 of the second reinforcement layer 18, and a reduction in functionality as the adhesion suppression layer 19 can be suppressed. On the other hand, if the ratio (D4/D2) is 0.35 or less, it is possible to keep the average thickness D4 of the adhesion suppression layer 19 from becoming too thick with respect to average thickness D2 of the second reinforcement layer 18, or in other words, keep the compressive stress of the adhesion suppression layer 19 from becoming too large with respect to the tensile stress of the second reinforcement layer 18. Consequently, the occurrence of cupping can be suppressed further.

The adhesion suppression layer 19 contains at least one from among carbon and metallic oxides, for example. It is preferable for the adhesion suppression layer 19 to be a carbon thin film having carbon as its main component or a metallic oxide film having a metallic oxide as its main component. The carbon is preferably diamond-like carbon (hereinafter referred to as "DLC"). The metallic oxide preferably contains at least one from among aluminum oxide, copper oxide, and cobalt oxide. For example, the adhesion suppression layer 19 may be a chemical vapor deposition (CVD) film formed by CVD, or a sputtered film formed by sputtering.

It is preferable for the adhesion suppression layer 19 to have a laminate structure of two or more layers. This is because the dimensional stability of the magnetic recording medium can be improved further. Note that the principle of the above is similar to the case of causing the reinforcement layer 15 to have a laminate structure of two or more layers in Modification 3. In the case in which the adhesion suppression layer 19 has a laminate structure of two or more layers, the material of each layer may be the same or different.

In the magnetic recording medium having the configuration described above, the internal stresses (tensile stresses) of the first and second reinforcement layers 17 and 18 cancel each other out, and the occurrence of cupping in the magnetic recording medium can be suppressed. Consequently, it is possible to provide a magnetic recording medium that can keep the state of contact between the magnetic head and the magnetic recording medium in a favorable state, while also excellent off-track characteristics with high dimensional stability in the track width direction. Also, in the magnetic recording medium manufacturing process, when the laminate 10 is wound into a roll, because the adhesion suppression layer 19 is interposed between the first and second reinforcement layers 17 and 18, metallic adhesion of the first and second reinforcement layers 17 and 18 can be suppressed.

(Modification 5)

The magnetic recording medium may also be configured to be capable of recording a signal having a shortest recording wavelength of 75 nm or less using a recording and reproduction device provided with a recording head other than a ring head (such as a single pole type (SPT) recording head, for example).

EXAMPLES

Hereinafter, the present technology will be described specifically using Examples, but the present technology is not limited to these Examples only.

In the following Examples 1 to 12 and Comparative Examples 1 to 8, the average particle size, the coercive force Hc (25), Hc (50), the squareness ratios S1 and S2, the activation volume $V_{act}$, the average thickness of the recording layer, and the average thickness of the foundation layer were obtained according to the methods described in the foregoing embodiment.

The following particles A1 to A5 and particles B to F were prepared as the magnetic powder for the recording layer.

[Powders of particles A1 to A5]

Powders of the particles A1 to A5 were fabricated as follows. First, a powder of substantially spherical ε iron oxide nanoparticles (ε-$Fe_2O_3$ crystal particles) was prepared. Next, by subjecting the powder of ε iron oxide nanoparticles to a reduction treatment and a gradual oxidation treatment as follows, a powder of core-shell ε iron oxide nanoparticles having a dual-layer shell part was obtained.

(Reduction Treatment)

First, the powder of ε iron oxide nanoparticles were placed on a quartz boat and loaded into a tube furnace. After loading, the tube furnace was once displaced with an $N_2$ atmosphere, and then raised to a predetermined temperature. After raising the temperature, a heat treatment at 350° C. was performed while causing 100% $H_2$ to flow at a flow rate of 100 ml/min. With this arrangement, the surface of the ε iron oxide nanoparticles was transformed into reduced α-Fe, and an α-Fe layer was formed on the surface of the ε iron oxide nanoparticles. At this point, by adjusting the time of the heat treatment (reduction treatment) at 350° C. in a range from 0.04 h to 0.45 h as illustrated in Table 1, the thickness of the α-Fe layer was varied within a range from 0.3 nm to 3.5 nm. After that, the tube furnace was displaced with an $N_2$ atmosphere again and cooled to room temperature. With this arrangement, a powder of core-shell ε iron oxide nanoparticles having the α-Fe on the surface was obtained.

(Gradual Oxidation Treatment)

Next, the tube furnace was heated to a predetermined temperature, and a heat treatment was performed for at 300° C. for 5 minutes while causing $N_2$ gas containing trace oxygen to flow at a flow rate of 100 ml/min. With this arrangement, the surface of the α-Fe layer was oxidized, and an α-$Fe_2O_3$ layer was formed on the surface of the α-Fe layer. After that, the tube furnace was displaced with an $N_2$ atmosphere again and cooled to room temperature. By the above, powders of core-shell ε iron oxide nanoparticles having an α-$Fe_2O_3$ layer (oxide film) and an α-Fe layer (soft magnetic layer) on the surface with an average particle size of 20 nm (powders of the particles A1 to A5) were obtained.

[Powders of Particles B]

Powders of the particles B were fabricated as follows. First, a powder of substantially spherical ε iron oxide nanoparticles (ε-$Fe_2O_3$ crystal particles) was prepared. Next, by subjecting the powder of ε iron oxide nanoparticles to a reduction treatment and a sputtering process as follows, a powder of core-shell ε iron oxide nanoparticles having a dual-layer shell part was obtained.

(Reduction Treatment)

First, by performing a reduction treatment similar to the powder of the particles A2, a powder of core-shell ε iron oxide nanoparticles having an α-Fe layer 2 nm thick on the surface was obtained.

(Sputtering Process)

Next, the particles after the reduction treatment were conveyed into a chamber for performing the sputtering process so as not to expose the particles to the air. Subsequently, by performing the sputtering process using an $Al_2O_3$ target while causing the particles to vibrate, a powder of core-shell ε iron oxide nanoparticles having an $Al_2O_3$ layer (oxide film) and an α-Fe layer (soft magnetic layer) on the surface with an average particle size of 20 nm (powder of the particles B) was obtained.

[Powders of Particles C]

Powders of the particles C were fabricated as follows. First, a powder of substantially spherical ε iron oxide nanoparticles (ε-$Fe_2O_3$ crystal particles) was prepared. Next, by subjecting the powder of ε iron oxide nanoparticles to the sputtering process as follows, a powder of core-shell ε iron oxide nanoparticles having a dual-layer shell part was obtained.

(Sputtering Process (Soft Magnetic Ni—Fe Film Deposition))

First, the ε iron oxide nanoparticles were conveyed into a chamber for performing the sputtering process. Subsequently, by performing the sputtering process using an Ni—Fe target while causing the particles to vibrate, a powder of core-shell ε iron oxide nanoparticles having an Ni—Fe alloy layer on the surface was obtained.

(Sputtering Process ($Al_2O_3$ Layer))

Next, by performing the sputtering process similar to the powder of the particles B, a powder of core-shell ε iron oxide nanoparticles having an $Al_2O_3$ layer (oxide film) and an Ni—Fe alloy layer (soft magnetic layer) on the surface with an average particle size of 20 nm (powder of the particles C) was obtained.

[Powder of Particles D]

A powder of substantially spherical ε iron oxide nanoparticles ($ε-Fe_2O_3$ crystal particles) with an average particle size of 20 nm was prepared and taken to be the powder of the particles D in an unchanged state, without performing the reduction treatment and the gradual oxidation treatment.

[Powder of Particles E]

For the powder of the particles E, a powder of Al-doped, substantially spherical ε iron oxide nanoparticles with an average particle size of 17 nm was prepared.

[Powders of Particles F]

For the powder of the particles F, a powder of Ga-doped, substantially spherical ε iron oxide nanoparticles with an average particle size of 17 nm was prepared.

The above powders of the particles A1 to A5 and the particles B to F, the powder of barium ferrite (BaFe) particles, and the powder of metal particles were used to fabricate the magnetic tape of Examples 1 to 12 and Comparative Examples 1 to 8 as follows.

Examples 1 to 5, 8 to 10, and Comparative Examples 1 and 2

(Recording Layer-Forming Coating Preparation Step)

The recording layer-forming coating was prepared as follows. First, a first composition with the formulation below was kneaded in an extruder. Next, the kneaded first composition and a second composition with the formulation below were added to a mixing tank provided with a disperser and premixed. Next, sand mill mixing was additionally performed, a filter treatment was performed, and the recording layer-forming coating was prepared.

(First Composition)

Powders of particles A1 to A5 (see Tables 1 and 2): 100 parts by mass

Vinyl chloride resin (cyclohexanone solution 30% by mass): 10 parts by mass (degree of polymerization 300, Mn=10000, containing $OSO_3K$=0.07 mmol/g, second-order OH=0.3 mmol/g as a polar group)

Aluminum oxide powder: 5 parts by mass ($α-Al_2O_3$, average particle diameter 0.2 μm)

Carbon black: 2 parts by mass (manufactured by Tokai Carbon Co., Ltd., product name: "SEAST TA")

(Second Composition)

Vinyl chloride resin: 1.1 parts by mass (resin solution: resin content 30% by mass, cyclohexanone 70% by mass)

n-Butyl stearate: 2 parts by mass

Methyl ethyl ketone: 121.3 parts by mass

Toluene: 121.3 parts by mass

Cyclohexanone: 60.7 parts by mass

Lastly, as a hardener, 4 parts by mass of polyisocyanate (product name: "Coronate L", manufactured by Nippon Polyurethane Industry Co., Ltd.) in and 2 parts by mass of myristic acid were added to the recording layer-forming coating prepared as described above.

(Foundation Layer-Forming Coating Preparation Step)

The foundation layer-forming coating was prepared as follows. First, a third composition with the formulation below was kneaded in an extruder. Next, the kneaded third composition and the fourth composition with the formulation below were added to the mixing tank provided with a disperser and premixed. Next, sand mill mixing was additionally performed, a filter treatment was performed, and the foundation layer-forming coating was prepared.

(Third Composition)

Needle-like iron oxide powder: 100 parts by mass ($α-Fe_2O_3$, average long-axis length 0.15 μm)

Vinyl chloride resin: 55.6 parts by mass (resin solution: resin content 30% by mass, cyclohexanone 70% by mass)

Carbon black: 10 parts by mass (Average particle diameter 20 nm)

(Fourth Composition)

Polyurethane resin UR8200 (manufactured by Toyobo Co., Ltd.): 18.5 parts by mass n-Butyl stearate: 2 parts by mass Methyl ethyl ketone: 108.2 parts by mass Toluene: 108.2 parts by mass Cyclohexanone: 18.5 parts by mass Lastly, as a hardener, 4 parts by mass of polyisocyanate (product name: "Coronate L", manufactured by Nippon Polyurethane Industry Co., Ltd.) and 2 parts by mass of myristic acid were added to the foundation layer-forming coating prepared as described above.

(Backcoat Layer-Forming Coating Preparation Step)

The backcoat layer-forming coating was prepared as follows. By mixing the raw materials below in the mixing tank provided with a disperser and performing a filter treatment, the backcoat layer-forming coating was prepared.

Carbon black (manufactured by Asahi Carbon Co., Ltd., product name: "#80"): 100 parts by mass Polyester polyurethane: 100 parts by mass (manufactured by Nippon Polyurethane Industry Co., Ltd., product name: "N-2304")

Methyl ethyl ketone: 500 parts by mass

Toluene: 400 parts by mass

Cyclohexanone: 100 parts by mass (Film Formation Step)

The coatings fabricated as described above were used to form, on a polyethylene naphthalate film (PEN film) 6.2 μm thick which is a non-magnetic supporting medium, a foundation layer with an average thickness of 1.2 μm and a recording layer with an average thickness of 75 nm as follows. First, by applying the foundation layer-forming coating to the PEN film and drying, the foundation layer was formed on the PEN film. Next, by applying the recording layer-forming coating to the foundation layer and drying, the recording layer was formed on the foundation layer. Note that while drying the recording layer-forming coating, the magnetic field of the magnetic powder was oriented in the thickness direction of the PEN film with a solenoid coil. Next, a calender process was performed on the PEN film having the foundation layer and the recording layer formed thereon, and the recording layer surface was smoothed. After that, by applying the backcoat layer-forming coating in a film 0.6 μm thick to the face on the opposite side from the recording layer and drying, a backcoat layer was formed.

(Cutting Step)

The PEN film having the foundation layer, the recording layer, and the backcoat layer formed thereon as described above was cut to a width of ½ inch (12.65 mm). With this arrangement, magnetic tapes having the coercive forces Hc (25), Hc (50), the squareness ratios S1 and S2, and the activation volume $V_{act}$ illustrated in Table 2 were obtained.

Note that the coercive force Hc (25) and Hc (50) were set to the values illustrated in Table 2 by adjusting the thickness of the α-Fe layer in the step of the reduction treatment of the particles A1 to A5 above, and also by adjusting the air volume of the drying air while orienting the magnetic field during the film formation of the recording layer in the recording layer film formation step above. Also, the squareness ratios S1 and S2 were set to the values illustrated in Table 2 by adjusting the air volume of the drying air while orienting the magnetic field during the film formation of the recording layer in the recording layer film formation step above. Furthermore, the activation volume $V_{act}$ was set to the values illustrated in Table 2 by adjusting the dispersion state of the magnetic powder (particles A1 to A5) in the recording layer-forming coating preparation step above.

Example 6

In the recording layer film formation step above, after orienting the magnetic field of the magnetic powder in the lengthwise direction of the PEN film (the transport direction of the magnetic tape), the magnetic field of the magnetic powder was oriented in the thickness direction (perpendicular direction) of the PEN film. Additionally, the squareness ratios S1 and S2 were set to the values illustrated in Table 2 by adjusting the strength of the magnetic field during the magnetic field orientation and the air volume of the drying air in the recording layer film formation step. Besides the above, magnetic tapes were obtained similarly to Example 2.

Example 7, and Comparative Example 3

In the recording layer film formation step above, after orienting the magnetic field of the magnetic powder in the width direction of the PEN film, the magnetic field of the magnetic powder was oriented in the thickness direction (perpendicular direction) of the PEN film. Additionally, the squareness ratios S1 and S2 were set to the values illustrated in Table 2 by adjusting the strength of the magnetic field during the magnetic field orientation and the air volume of the drying air in the recording layer film formation step. Besides the above, magnetic tapes were obtained similarly to Example 2.

Examples 11 and 12, and Comparative Examples 4, 7, and 8

As illustrated in Table 2, besides using the powders of the particles B, C, D, E, and F instead of the powder of the particles A1, magnetic tapes were obtained similarly to Example 1.

Comparative Example 5

As illustrated in Table 2, besides using the powder of the hexagonal plate-like barium ferrite (BaFe) particles instead of the powder of the particles A1, a magnetic tape was obtained similarly to Example 1.

Comparative Example 6

As illustrated in Table 2, besides using the powder of needle-like Fe—Co alloy metal particles instead of the powder of the particles A1, a magnetic tape was obtained similarly to Example 1.

[Evaluation of Magnetic Tapes]

The magnetic tapes of Examples 1 to 12 and Comparative Examples 1 to 8 obtained as described above were evaluated as follows.

(SNR in a 25° C. Environment)

A ½ inch tape transport device with an attached recording/reproduction head and a recording/reproduction amp (MTS Transport, manufactured by Mountain Engineering II, Inc.) was used to measure the SNR (electromagnetic conversion characteristics) of the magnetic tapes in a 25° C. environment. For the recording head, a ring head with a gap length of 0.2 μm was used, and for the reproduction head, a GMR head with a shield-to-shield distance of 0.1 μm was used. The relative speed was set to 6 m/s, and the recording clock frequency to 160 MHz. Also, the SNR was computed on the basis of the method described in the following literature. As a result, the SNR of Example 4 is illustrated in Table 2 as a value relative to 0 dB.

Y. Okazaki: "An Error Rate Emulation System.", IEEE Trans. Man., 31, pp. 3093-3095(1995)

(Amount of SNR Degradation)

First, a ½ inch tape transport device with an attached recording/reproduction head and a recording/reproduction amp (MTS Transport, manufactured by Mountain Engineering II, Inc.) was used to measure the SNR in 25° C. and 50° C. environments. Note that the measurement conditions and the method of computing the SNR were similar to the method of measuring the "SNR in a 25° C. environment" above. Next, the amount of SNR degradation was computed according to the formula below. The results are illustrated in Table 2.

(Amount of SNR degradation) [dB]=(SNR measured at environmental temperature of 50° C.)−(SNR measured at environmental temperature of 25° C.)

Table 1 illustrates the configurations of the magnetic powders used in the fabrication of the magnetic tapes of Examples 1 to 12 and Comparative Examples 1 to 4, 7, and 8.

TABLE 1

| Particle type | Average particle size of all particles (nm) | Core part Material | First shell part (soft magnetic layer) Material | Reduction treating duration (H) | Thickness (nm) | Second shell part (oxide film) Material |
|---|---|---|---|---|---|---|
| Particle A1 | 20 | ε iron oxide | aFe | 0.4 | 3 | aFe$_2$O$_3$ |
| Particle A2 |  |  |  | 0.32 | 2 |  |
| Particle A3 |  |  |  | 0.12 | 0.7 |  |
| Particle A4 |  |  |  | 0.04 | 0.3 |  |
| Particle A5 |  |  |  | 0.45 | 3.5 |  |
| Particle B | 20 | ε iron oxide | aFe | 0.32 | 2 | Al$_2$O$_3$ |
| Particle C | 20 | ε iron oxide | Ni—Fe alloy | Sputtering | 2 | Al$_2$O$_3$ |
| Particle D | 20 | ε iron oxide | None | — | — | None |
| Particle E | 17 | Al-doped ε iron oxide | None | — | — | None |
| Particle F | 17 | Ga-doped ε iron oxide | None | — | — | None |

Table 2 illustrates the configurations and evaluation results of the magnetic tapes of Examples 1 to 12 and Comparative Examples 1 to 8.

TABLE 2

|  | Magnetic powder | Hc(50) (kA/m) | Hc(25) (kA/m) | Hc(50)/Hc(25) × 100 (%) | S1 (%) | S2 (%) | S1/S2 | Vact (nm$^3$) | Amount of SNR degradation (dB) | SNR in 25° C. environment (dB) |
|---|---|---|---|---|---|---|---|---|---|---|
| Example 1 | Particle A1 | 200 | 210 | 95 | 25 | 25 | 1 | 4800 | −1 | 0.2 |
| Example 2 | Particle A2 | 233 | 240 | 97 | 25 | 25 | 1 | 4800 | −0.5 | 0.4 |
| Example 3 | Particle A3 | 294 | 300 | 98 | 25 | 25 | 1 | 4800 | 0 | 0.8 |
| Example 4 | Particle A2 | 228 | 240 | 95 | 30 | 30 | 1 | 4800 | −0.5 | 0 |
| Example 5 | Particle A2 | 235 | 240 | 98 | 20 | 20 | 1 | 4800 | 0 | 0.6 |
| Example 6 | Particle A2 | 233 | 240 | 97 | 25 | 21 | 1.2 | 4800 | 0 | 0.6 |
| Example 7 | Particle A2 | 230 | 240 | 96 | 25 | 28 | 0.9 | 4800 | −0.5 | 0.4 |
| Example 8 | Particle A2 | 228 | 240 | 95 | 25 | 25 | 1 | 2500 | −0.5 | 0.9 |
| Example 9 | Particle A4 | 340 | 350 | 97 | 25 | 25 | 1 | 4800 | 0 | −1.2 |
| Example 10 | Particle A2 | 233 | 240 | 97 | 25 | 25 | 1 | 10000 | 0 | −1.9 |
| Example 11 | Particle B | 230 | 240 | 96 | 25 | 25 | 1 | 4800 | −0.5 | 0.4 |
| Example 12 | Particle C | 230 | 240 | 96 | 25 | 25 | 1 | 4800 | −0.5 | 0.4 |
| Comparative Example 1 | Particle A5 | 153 | 180 | 85 | 25 | 25 | 1 | 4800 | −2 | −0.5 |
| Comparative Example 2 | Particle A2 | 192 | 240 | 80 | 35 | 35 | 1 | 4800 | −2.5 | −0.6 |
| Comparative Example 3 | Particle A2 | 216 | 240 | 90 | 30 | 43 | 0.7 | 4800 | −1.7 | −1.7 |
| Comparative Example 4 | Particle D | 1238 | 1250 | 99 | 35 | 35 | 1 | 4800 | — | — |
| Comparative Example 5 | BaFe | 175 | 190 | 92 | 25 | 25 | 1 | 4500 | −1.6 | −0.3 |
| Comparative Example 6 | Metal | 171 | 190 | 90 | 60 | 60 | 1 | 5000 | −1.8 | −4.4 |
| Comparative Example 7 | Particle E | 218 | 240 | 91 | 25 | 25 | 1 | 4800 | −1.9 | 0.1 |
| Comparative Example 8 | Particle F | 216 | 240 | 90 | 25 | 25 | 1 | 4800 | −1.7 | 0.1 |

Hc (25): coercive force measured in the thickness direction (perpendicular direction) of the magnetic tape at an environment temperature of 25° C.

Hc (50): coercive force measured in the thickness direction (perpendicular direction) of the magnetic tape at an environment temperature of 50° C.

S1: squareness ratio measured in the lengthwise direction of the magnetic tape at an environmental temperature of 25° C.

S2: squareness ratio measured in the width direction of the magnetic tape at an environmental temperature of 25° C.

$V_{act}$: activation volume of the magnetic powder

From the above evaluations, the following was learned.

In Examples 1 to 12, because (a) the recording layer contains a powder of ε iron oxide particles, (b) the ratio R (=Hc(50)/Hc(25)×100) of the coercive force Hc(50) and the coercive force Hc(25) is 95% or greater, (c) the coercive force Hc(25) is 200 kA/m or greater, and (d) the squareness ratio S1 measured in the transport direction of the magnetic recording medium is 30% or less, the amount of SNR degradation with respect to temperature change can be suppressed.

In Comparative Examples 1 to 8, 11, and 12, because (a) the recording layer contains a powder of ε iron oxide particles, (b) the ratio R of the coercive force Hc(50) and the coercive force Hc(25) is 95% or greater, (c) the coercive force Hc(25) is 200 kA/m or greater and 340 kA/m or less, (d) the squareness ratio S1 measured in the transport direction of the magnetic recording medium is 30% or less, and (e) the activation volume $V_{act}$ is 5000 nm$^3$ or less, the amount of SNR degradation with respect to temperature change can be suppressed, while in addition, a favorable SNR can be obtained at an environmental temperature of 25° C.

In Comparative Example 1, because the coercive force Hc(25) is less than 200 kA/m, the temperature dependence of the coercive force Hc is large, the ratio R of the coercive force Hc(50) and the coercive force Hc(25) is less than 95%, and the amount of SNR degradation with respect to temperature change increases.

In Comparative Example 2, because the squareness ratios S1 and S2 in the lengthwise and width directions both exceed 30%, the perpendicular orientation is low, the ratio R of the coercive force Hc(50) and the coercive force Hc(25) is less than 95%, and the amount of SNR degradation with respect to temperature change increases.

In Comparative Example 3, because the squareness ratio S2 in the width direction exceeds 30%, the perpendicular orientation is low, the ratio R of the coercive force Hc(50) and the coercive force Hc(25) is less than 95%, and the amount of SNR degradation with respect to temperature change increases. Also, the SNR at an environmental temperature of 25° C. becomes worse.

In Comparative Example 4, because a shell layer is not formed, the coercive force Hc(25) is too high, and signal recording is difficult.

In Comparative Examples 5 and 6, because a powder of barium ferrite (BaFe) particles and a powder of Fe—Co alloy metal particles are used as the magnetic powder, the coercive force Hc(25) is less than 200 kA/m. Consequently, the temperature dependence of the coercive force Hc is large, the ratio R of the coercive force Hc(50) and the coercive force Hc(25) becomes less than 95%, and the amount of SNR degradation with respect to temperature change increases. Also, in Comparative Example 6, because the particles are needle-like, the squareness ratios S1 and S2 in the lengthwise and width directions both greatly exceed 30%. Consequently, the perpendicular orientation is extremely low, and the SNR at an environmental temperature of 25° C. becomes much worse.

In Comparative Examples 7 and 8, the coercive force Hc is adjusted by adding Al and Ga, but the temperature dependence of the coercive force Hc is large, the ratio R of the coercive force Hc(50) and the coercive force Hc(25) is less than 95%, and the amount of SNR degradation with respect to temperature change increases.

The above specifically describes an embodiment and Examples of the present technology, but the present technology is not limited to the embodiment and Examples described above, and various modifications based on the technical ideas of the present technology are possible.

For example, the configurations, methods, steps, shapes, materials, numerical quantities, and the like given in the embodiment and Examples described above are merely examples, and configurations, methods, steps, shapes, materials, numerical quantities, and the like that are different from the above may also be used as necessary. Also, the chemical formulas of compounds and the like are representative, and if a common name for the same compound exists, the chemical formula is not limited to the described valencies and the like.

In addition, it is also possible to combine the configurations, methods, steps, shapes, materials, numerical quantities, and the like of the embodiment and Examples described above with each other insofar as the combination does not depart from the gist of the present technology.

Additionally, the present technology may also be configured as below.

(1)

A magnetic recording medium including:

a recording layer containing a powder of particles containing ε iron oxide, in which a ratio ((Hc(50)/Hc(25))×100) of a coercive force Hc(50) measured in a thickness direction of the magnetic recording medium at 50° C. and a coercive force Hc(25) measured in the thickness direction of the magnetic recording medium at 25° C. is 95% or greater, the coercive force Hc(25) is 200 kA/m or greater, and a squareness ratio measured in a transport direction of the magnetic recording medium is 30% or less.

(2)

The magnetic recording medium according to (1), in which the coercive force Hc(25) is 200 kA/m or greater and 340 kA/m or less.

(3)

The magnetic recording medium according to (1) or (2), in which the particles have a core-shell structure.

(4)

The magnetic recording medium according to any one of (1) to (3), in which the particles are provided with a core part containing ε iron oxide, and a shell part containing a soft magnetic material.

(5)

The magnetic recording medium according to (4), in which the shell part is provided with a first shell part provided on the core part, and a second shell part provided on the first shell part, the first shell part contains α-Fe, a NiFe alloy, or a FeSiAl alloy, and the second shell part contains a iron oxide, aluminum oxide, or silicon oxide.

(6)

The magnetic recording medium according to any one of (1) to (5), in which an activation volume is 5000 nm$^3$ or less.

(7)

The magnetic recording medium according to any one of (1) to (6), in which a squareness ratio measured in a width direction of the magnetic recording medium is 30% or less.

(8)

The magnetic recording medium according to any one of (1) to (7), in which the magnetic recording medium is used in a library device.

(9)

The magnetic recording medium according to any one of (1) to (8), in which the magnetic recording medium is used in a recording and reproduction device having a shortest recording wavelength of 75 nm or less.

(10)

The magnetic recording medium according to (9), in which the recording and reproduction device is provided with a ring head as a head for recording.

REFERENCE SIGNS LIST

11 Substrate
12 Foundation layer
13 Recording layer
14 Backcoat layer
15 Reinforcement layer
16 Cupping suppression layer
17 First reinforcement layer
18 Second reinforcement layer 19 Adhesion suppression layer
21 Core part
22, 23 Shell part
22a First shell part
22b Second shell part

The invention claimed is:

1. A magnetic recording medium comprising:
a recording layer containing a powder of particles containing ε iron oxide, wherein
a ratio ((Hc(50)/Hc(25))×100) of a coercive force Hc(50) measured in a thickness direction of the magnetic recording medium at 50° C. and a coercive force Hc(25) measured in the thickness direction of the magnetic recording medium at 25° C. is 95% or greater,
a squareness ratio measured in a transport direction of the magnetic recording medium is 30% or less,
wherein the coercive force Hc(25) ranges from 200 kA/m to 300 kA/m, and
wherein an activation volume is 5000 nm³ or less.

2. The magnetic recording medium according to claim 1, wherein the particles have a core-shell structure.

3. The magnetic recording medium according to claim 1, wherein the particles are provided with
a core part containing ε iron oxide, and
a shell part containing a soft magnetic material.

4. The magnetic recording medium according to claim 3, wherein
the shell part is provided with
a first shell part provided on the core part, and
a second shell part provided on the first shell part,
the first shell part contains α-Fe, a NiFe alloy, or a FeSiAl alloy, and
the second shell part contains a iron oxide, aluminum oxide, or silicon oxide.

5. The magnetic recording medium according to claim 1, wherein a squareness ratio measured in a width direction of the magnetic recording medium is 30% or less.

6. The magnetic recording medium according to claim 1, wherein the magnetic recording medium is used in a library device.

7. The magnetic recording medium according to claim 1, wherein the magnetic recording medium is used in a recording and reproduction device having a shortest recording wavelength of 75 nm or less.

8. The magnetic recording medium according to claim 7, wherein the recording and reproduction device is provided with a ring head as a head for recording.

9. The magnetic recording medium according to claim 1, wherein the coercive force Hc(25) ranges from 240 kA/m to 300 kA/m.

10. The magnetic recording medium according to claim 1, wherein the activation volume ranges from 2500 nm³ to 4800 nm³.

* * * * *